US012074307B2

(12) United States Patent
Park et al.

(10) Patent No.: US 12,074,307 B2
(45) Date of Patent: Aug. 27, 2024

(54) METHOD OF PREPARING POSITIVE ELECTRODE ACTIVE MATERIAL FOR LITHIUM SECONDARY BATTERY, POSITIVE ELECTRODE ACTIVE MATERIAL FOR LITHIUM SECONDARY BATTERY, AND POSITIVE ELECTRODE FOR LITHIUM SECONDARY BATTERY AND LITHIUM SECONDARY BATTERY INCLUDING THE SAME

(71) Applicant: LG Chem, Ltd., Seoul (KR)

(72) Inventors: Sang Min Park, Daejeon (KR); Hwa Seok Chae, Daejeon (KR); Sin Young Park, Daejeon (KR); Hong Kyu Park, Daejeon (KR); Seong Hoon Kang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 920 days.

(21) Appl. No.: 17/040,787

(22) PCT Filed: Apr. 4, 2019

(86) PCT No.: PCT/KR2019/004018
§ 371 (c)(1),
(2) Date: Sep. 23, 2020

(87) PCT Pub. No.: WO2019/194609
PCT Pub. Date: Oct. 10, 2019

(65) Prior Publication Data
US 2021/0005874 A1    Jan. 7, 2021

(30) Foreign Application Priority Data

Apr. 4, 2018   (KR) .................. 10-2018-0039359
Mar. 20, 2019  (KR) .................. 10-2019-0031933

(51) Int. Cl.
*H01M 4/04*    (2006.01)
*H01M 4/02*    (2006.01)
*H01M 4/505*   (2010.01)
*H01M 4/525*   (2010.01)
*H01M 10/0525* (2010.01)

(52) U.S. Cl.
CPC ....... *H01M 4/0459* (2013.01); *H01M 4/0471* (2013.01); *H01M 4/505* (2013.01); *H01M 4/525* (2013.01); *H01M 10/0525* (2013.01); *H01M 2004/028* (2013.01)

(58) Field of Classification Search
CPC .. H01M 4/0471; H01M 4/131; H01M 4/1391; H01M 4/366; H01M 4/505; H01M 4/525; H01M 2004/028
See application file for complete search history.

(56) References Cited

U.S. PATENT DOCUMENTS

| 7,727,673 B2   | 6/2010  | Ooyama et al.     |
| 2007/0224506 A1 | 9/2007  | Ooyama et al.     |
| 2011/0244331 A1 | 10/2011 | Karthikeyan et al. |
| 2013/0175469 A1 | 7/2013  | Paulsen et al.    |
| 2014/0158932 A1 | 6/2014  | Sun et al.        |
| 2015/0104704 A1 | 4/2015  | Kim et al.        |
| 2018/0198155 A1 | 7/2018  | Park et al.       |
| 2018/0287135 A1 | 10/2018 | Shin et al.       |
| 2018/0294477 A1 | 10/2018 | Shin et al.       |
| 2018/0309123 A1 | 10/2018 | Jo et al.         |
| 2019/0036119 A1 | 1/2019  | Lee et al.        |

FOREIGN PATENT DOCUMENTS

| CN | 103490060 A   | 1/2014  |
| CN | 103500827 A   | 1/2014  |
| CN | 105118991 A   | 12/2015 |
| CN | 107851788 A   | 3/2018  |
| EP | 3151317 A1    | 4/2017  |
| EP | 3282506 A1    | 2/2018  |
| JP | 2012089472 A  | 5/2012  |
| JP | 2013524440 A  | 6/2013  |
| JP | 2013541129 A  | 11/2013 |
| JP | 2015525950 A  | 9/2015  |
| KR | 20140081663 A | 7/2014  |
| KR | 101510940 B1  | 4/2015  |

(Continued)

OTHER PUBLICATIONS

English translation of KR Publication 2017-0075596, Jul. 2017.*
English translation of KR Publication 2017-0075437, Jul. 2017.*
English translation of KR Publication 2016-0045029, Apr. 2016.*
Yin Zhang et al., "Studies on stability and capacity for long-life cycle performance of Li(Ni0.5Co0.2Mn0.3)O2 by Mo modification for lithium-ion battery", Journal of Power Sources, Aug. 2017, vol. 358, pp. 1-12.
Search Report dated Sep. 13, 2022 from Office Action for Chinese Applicaion No. 2019800202042 issued Sep. 20, 2022. 3 pgs.
Extended European Search Report including Written Opinion for Application No. 19780677.1 dated May 3, 2021, 6 pages.

(Continued)

*Primary Examiner* — Brittany L Raymond
(74) *Attorney, Agent, or Firm* — Lerner David LLP

(57) ABSTRACT

A method of preparing a positive electrode active material for a lithium secondary battery includes mixing a transition metal hydroxide containing transition metals including nickel (Ni), cobalt (Co) and manganese (Mn), a lithium-containing raw material and a doping raw material including at least one doping element selected from the group consisting of Al, Mg, Co, V, Ti, Zr and W and performing a first calcination treatment thereon to prepare a lithium composite transition metal oxide doped with the doping element; and mixing the lithium composite transition metal oxide and a coating raw material including at least one coating element selected from the group consisting of Al, Mg, Co, Ti, Zr and B and performing a second calcination treatment thereon to prepare a positive electrode active material in which a coating layer containing the coating element is formed on the lithium composite transition metal oxide.

13 Claims, No Drawings

(56) References Cited

FOREIGN PATENT DOCUMENTS

| | | | |
|---|---|---|---|
| KR | 20150136953 A | | 12/2015 |
| KR | 2016-0045029 | * | 4/2016 |
| KR | 20160045029 A | | 4/2016 |
| KR | 20170063395 A | | 6/2017 |
| KR | 20170063396 A | | 6/2017 |
| KR | 2017-0075437 | * | 7/2017 |
| KR | 2017-0075596 | * | 7/2017 |
| KR | 20170075124 A | | 7/2017 |
| KR | 20170075437 A | | 7/2017 |
| KR | 20170075596 A | | 7/2017 |
| KR | 20170076348 A | | 7/2017 |
| KR | 20170103505 A | | 9/2017 |
| KR | 20170106810 A | | 9/2017 |
| KR | 20170117541 A | | 10/2017 |
| KR | 20180004672 A | | 1/2018 |

OTHER PUBLICATIONS

Liu, Bao-Sheng et al., "Investigation on electrochemical performance of LiNi0.8Co0.15Al0.05O2 coated by heterogeneous layer of TiO2", Journal of Alloys and Compounds, online Dec. 2017, pp. 961-971, vol. 739, Elsevier Sequoia, Lausanne, CH.

Search report from International Application No. PCT/KR2019/004018, mailed Jul. 15, 2019.

Search Report dated Apr. 25, 2022 from Office Action for Chinese Applicaion No. 2019800202042 issued Apr. 29, 2022. 3 pgs. (see p. 2-3, categorizing the cited references).

* cited by examiner

METHOD OF PREPARING POSITIVE ELECTRODE ACTIVE MATERIAL FOR LITHIUM SECONDARY BATTERY, POSITIVE ELECTRODE ACTIVE MATERIAL FOR LITHIUM SECONDARY BATTERY, AND POSITIVE ELECTRODE FOR LITHIUM SECONDARY BATTERY AND LITHIUM SECONDARY BATTERY INCLUDING THE SAME

CROSS-REFERENCE TO RELATED APPLICATION

This application is a national phase entry under 35 U.S.C. § 371 of International Application No. PCT/KR2019/004018, filed Apr. 4, 2019, which claims priorities to Korean Patent Application No. 10-2018-0039359, filed Apr. 4, 2018 and Korean Patent Application No. 10-2019-0031933, filed Mar. 20, 2019, the disclosures of which are incorporated herein by reference.

TECHNICAL FIELD

The present invention relates to a method of preparing a positive electrode active material for a lithium secondary battery, a positive electrode active material for a lithium secondary battery, and a positive electrode for a lithium secondary battery and a lithium secondary battery including the same.

BACKGROUND ART

Recently, as the use of electronic devices with batteries, such as a mobile phone, a portable notebook computer, an electric vehicle and the like, is rapidly spreading, demand for a lithium secondary battery which is small and light yet has a relatively high capacity is increasing, and this trend continues to accelerate. Especially, lithium secondary batteries are light in weight and have a high energy density, and thus are receiving the spotlight as a driving power source for portable devices. Accordingly, efforts on research and development for improving the performance of the lithium secondary battery have been actively made.

Lithium secondary batteries include a positive electrode and a negative electrode that include an active material allowing intercalation and deintercalation of lithium ions, and an organic electrolyte or a polymer electrolyte interposed therebetween. Such lithium secondary batteries generate electric energy according to oxidation and reduction reactions occurring when lithium ions are intercalated in and deintercalated from in the positive and negative electrodes.

As a positive electrode active material for the lithium secondary battery, a lithium-cobalt oxide ($LiCoO_2$) is mainly used. Further, the use of a lithium-manganese oxide such as $LiMnO_2$ with a layered crystalline structure or $LiMn_2O_4$ with a spinel crystalline structure, a lithium-nickel oxide ($LiNiO_2$) and the like is also considered.

In the positive electrode active materials, although $LiCoO_2$ with excellent lifespan and charge-discharge efficiency is widely used, $LiCoO_2$ has disadvantages such as poor high-temperature stability and a high price due to use of cobalt as a limited mineral resource resulting in a limitation in price competitiveness.

Lithium-manganese oxides such as $LiMnO_2$, $LiMn_2O_4$, etc. have advantages such as excellent thermal stability, a low price and easy synthesis, but entail problems such as low capacity, poor high-temperature characteristics and low conductivity.

Further, a lithium-nickel oxide such as $LiNiO_2$ and the like is relatively cheap and has a battery characteristic of high discharge capacity, but shows a rapid phase transition in crystalline structure caused by a variation in volume during a charge-discharge cycle and encounters a problem of drastically reduced stability when exposed to air and moisture.

Accordingly, recently, a lithium composite transition metal oxide wherein nickel in the oxide was partially substituted with any other transition metal such as manganese, cobalt, and the like has been proposed as an alternative material. Such a lithium composite transition metal oxide with high nickel content has excellent cycle characteristics and capacity properties, but, when a cell is used for a long time, the cycle characteristics are drastically deteriorated and some problems of the cell such as cell swelling due to gas generation, degradation of thermal stability due to reduced chemical stability, etc. are not sufficiently overcome.

Therefore, there is a high need for a positive electrode active material capable of solving the thermal stability problem while exhibiting improved output and cycle characteristics

RELATED ART

Patent Document

Korean Patent Publication No. 10-1510940

DISCLOSURE

Technical Problem

One object of the present invention is to provide a method of preparing a positive electrode active material for a lithium secondary battery having improved capacity characteristics, cycle characteristics and durability by controlling the content ratio of the doping element and coating element of the positive electrode active material.

Further, another object of the present invention is to provide a positive electrode active material for a lithium secondary battery having improved capacity characteristics, cycle characteristics and durability by controlling the content ratio of the doping element and coating element.

Further, still another object of the present invention is to provide a positive electrode for a lithium secondary battery and lithium secondary battery including the above-described positive electrode active material for a lithium secondary battery.

Technical Solution

The present invention provides a method of preparing a positive electrode active material for a lithium secondary battery including the steps of: mixing a transition metal hydroxide containing transition metals including nickel (Ni), cobalt (Co) and manganese (Mn), a lithium-containing raw material and a doping raw material including at least one doping element selected from the group consisting of Al, Mg, Co, V, Ti, Zr and W and performing a first calcination treatment thereon to prepare a lithium composite transition metal oxide doped with the doping element; and mixing the lithium composite transition metal oxide and a coating raw material including at least one coating element selected from the group consisting of Al, Mg, Co, Ti, Zr and B and performing a second calcination treatment thereon to prepare a positive electrode active material for a lithium secondary battery in which a coating layer containing the coating element is formed on the lithium composite transition metal oxide, wherein the doping raw material and the coating raw material are introduced such that the ratio of the weight of the doping element to the weight of the coating element in the positive electrode active material for a lithium secondary battery is in a range of 0.3 to 7.

Further, the present invention provides a positive electrode active material for a lithium secondary battery including: a lithium composite transition metal oxide including transition metals including nickel (Ni), cobalt (Co) and manganese (Mn), and at least one doping element selected from the group consisting of Al, Mg, Co, V, Ti, Zr and W doped therein; and a coating layer formed on the lithium composite transition metal oxide and including at least one coating element selected from the group consisting of Al, Mg, Co, Ti, Zr and B, wherein the ratio of the weight of the doping element to the weight of the coating element is in a range of 0.3 to 7.

Further, the present invention provides a positive electrode for a lithium secondary battery including the above-described positive electrode active material for a lithium secondary battery.

Further, the present invention provides a lithium secondary battery including the above-described positive electrode for a lithium secondary battery.

Advantageous Effects

The method of preparing a positive electrode active material for a lithium secondary battery according to the present invention includes doping and coating processes by first and second calcination processes, and the ratio of the weight of the doping element to the weight of the coating element in the positive electrode active material is adjusted to 0.3 to 7. Accordingly, it is possible to improve the high-temperature lifetime characteristics and the increase in resistance of the lithium composite transition metal oxide, particularly of the lithium composite transition metal oxide with a high nickel content, and a high level of capacity characteristics and high-temperature storage characteristics can be realized.

Modes of the Invention

Terminology used in the specification and claims should not be construed as limited to conventional or literal meanings, and should be construed as having meanings and concepts corresponding to the technical idea of the present invention based on the principle that the inventor can suitably define the concept of a term to explain his own invention in the most preferable way.

The terms used in the present specification are only used to describe specific various embodiments, and are not intended to limit the present invention. It is to be understood that the singular forms include plural referents unless the context clearly dictates otherwise.

In the present specification, the expressions such as "include", "include" or "have" should be construed as specifying the presence of a certain characteristic, number, operation, constituent element, component or a combination thereof, but should not be construed as excluding the possibility of the presence or addition of one or more other characteristics, numbers, operations, constituent elements, components or combinations thereof.

In the present specification, "%" represents weight percentages unless otherwise indicated.

Hereinafter, the present invention will be described in detail.

Method of Preparing Positive Electrode Active Material for Lithium Secondary Battery A method of preparing a positive electrode active material for a lithium secondary battery according to the present invention includes steps of: mixing a transition metal hydroxide containing transition metals including nickel (Ni), cobalt (Co) and manganese (Mn), a lithium-containing raw material and a doping raw material including at least one doping element selected from the group consisting of Al, Mg, Co, V, Ti, Zr and W and performing a first calcination treatment thereon to prepare a lithium composite transition metal oxide doped with the doping element; and mixing the lithium composite transition metal oxide and a coating raw material including at least one coating element selected from the group consisting of Al, Mg, Co, Ti, Zr and B and performing a second calcination treatment thereon to prepare a positive electrode active material for a lithium secondary battery in which a coating layer containing the coating element is formed on the lithium composite transition metal oxide. The doping raw material and the coating raw material are introduced such that the ratio of the weight of the doping element to the weight of the coating element in the positive electrode active material for a lithium secondary battery is in a range of 0.3 to 7.

According to the method of preparing a positive electrode active material for a lithium secondary battery according to the present invention, a positive electrode active material including a doping element doped therein and a coating element-containing coating layer formed on the surface thereof may be prepared by the first and second calcination processes. The weight ratio of the coating element and the doping element is adjusted to a specific range to exhibit high structural stability and thermal stability of the active material. Accordingly, it is possible to realize excellent capacity and high-temperature cycle characteristics of the battery. In particular, in the lithium composite transition metal oxide with a high nickel content or a lithium composite transition metal oxide with a high lithium content, it is possible to exhibit improved structural stability and thermal stability and to realize excellent capacity and high-temperature cycle characteristics.

A method of preparing a positive electrode active material for a lithium secondary battery according to the present invention includes a step of mixing a transition metal hydroxide containing at least two transition metals selected from the group consisting of nickel (Ni), cobalt (Co) and manganese (Mn), a lithium-containing raw material and a doping raw material including at least one doping element selected from the group consisting of Al, Mg, Co, V, Ti, Zr and W and performing a first calcination treatment thereon to prepare a lithium composite transition metal oxide doped with the doping element.

The transition metal hydroxide includes transition metals including nickel (Ni), cobalt (Co) and manganese (Mn).

The transition metal hydroxide may be a transition metal hydroxide having a high nickel content, that is, a nickel (Ni) content of 70 mol % or more among the total transition metal elements contained in the transition metal hydroxide. More preferably, the content of nickel (Ni) among the total transition metal elements may be 75 mol % or more. When a transition metal hydroxide having a high nickel (Ni) content of 70 mol % or more among the total transition metal elements as in the present invention is used, a higher capacity may be secured.

For example, the transition metal hydroxide may be a compound represented by the following Formula 1.

$$Ni_aCo_bMn_c(OH)_2 \quad \text{[Formula 1]}$$

In Formula 1, a+b+c=1, 0.7≤a<1, 0<b≤0.3, 0<c≤0.3.

In the transition metal hydroxide of Formula 1, Ni may be included in the content corresponding to a, for example, in the content corresponding to 0.7≤a<1, and specifically in the content corresponding to 0.75≤a<1. When the content of Ni in the transition metal hydroxide of Formula 1 is 0.7 or more, the amount of Ni sufficient to contribute to charging and discharging is secured in the positive electrode active material prepared by including Ni within the above-described range, and thus the capacity of the battery may be increased.

In the transition metal hydroxide of Formula 1, Co may be included in the content corresponding to b, that is, in the content corresponding to 0<b≤0.3. When the content of Co in the transition metal hydroxide of Formula 1 exceeds 0.3, a cost increase may be caused. Considering the remarkable improvement of charge and discharge efficiency depending on the presence of Co, more specifically, the content of the Co may be 0.05≤b≤0.2.

In the transition metal hydroxide of Formula 1, Mn may secure lifetime characteristics and structural stability. Considering these effects, the Mn may be included in the content corresponding to c, that is, in the content of 0<c≤0.3. When c in the transition metal hydroxide of Formula 1 exceeds 0.3, the output characteristics and charge and discharge efficiency of the battery may be rather deteriorated, and more specifically, the content of the Mn may be 0.05≤c≤0.2.

The transition metal hydroxide may be prepared by a coprecipitation reaction of a metal solution containing at least two transition metal-containing raw materials selected from the group consisting of a nickel (Ni)-containing raw material, a cobalt (Co)-containing raw material and a manganese (Mn)-containing raw material.

The nickel (Ni)-containing raw material may be, for example, a nickel-containing acetate, nitrate, sulfate, halide, sulfide, hydroxide, oxide, oxyhydroxide or the like. Specific examples thereof include $Ni(OH)_2$, NiO, NiOOH, $NiCO_3.2Ni(OH)_2.4H_2O$, $NiC_2O_2.2H_2O$, $Ni(NO_3)_2.6H_2O$, $NiSO_4$, $NiSO_4.6H_2O$, fatty acid nickel salts, nickel halides or combinations thereof, but are not limited thereto.

The cobalt (Co)-containing raw material may be a cobalt-containing acetate, nitrate, sulfate, halide, sulfide, hydroxide, oxide or oxyhydroxide. Specific examples thereof include $Co(OH)_2$, CoOOH, $Co(OCOCH_3)_2.4H_2O$, $Co(NO_3)_2.6H_2O$, $Co(SO_4)_2.7H_2O$ or a combination thereof, but are not limited thereto.

The manganese (Mn)-containing raw material may be, for example, a manganese-containing acetate, nitrate, sulfate, halide, sulfide, hydroxide, oxide, oxyhydroxide or a combination thereof. Specific examples thereof include manganese oxides such as $Mn_2O_3$, $MnO_2$, $Mn_3O_4$ and the like; manganese salts such as $MnCO_3$, $Mn(NO_3)_2$, $MnSO_4$, $MnSO_4H_2O$, manganese acetate, manganese dicarboxylate, manganese citrate, and manganese fatty acid salts; manganese oxyhydroxide, manganese chloride, or a combination thereof, but are not limited thereto.

The metal solution may be prepared by dissolving the nickel (Ni)-containing raw material, the cobalt (Co)-containing raw material and/or the manganese (Mn)-containing raw material in a solvent, specifically, water or a mixed solvent of water and an organic solvent (specifically, an alcohol or the like) which may be uniformly mixed with water, or may be prepared by mixing an aqueous solution of the nickel (Ni)-containing raw material, the cobalt (Co)-containing raw material and/or a manganese (Mn)-containing raw material.

The transition metal hydroxide may be prepared by adding an ammonium cation-containing composite-forming agent and a basic compound to the metal solution, followed by a coprecipitation reaction.

For example, the ammonium cation-containing composite-forming agent may be $NH_4OH$, $(NH_4)_2SO_4$, $NH_4NO_3$, $NH_4Cl$, $CH_3COONH_4$, $(NH_4)_2CO_3$ or a combination thereof, but is not limited thereto. Meanwhile, the ammonium cation-containing composite-forming agent may be used in the form of an aqueous solution. Here, as the solvent, water or a mixture of water and an organic solvent (specifically, an alcohol or the like) which may be uniformly mixed with water may be used.

The basic compound may be a hydroxide of an alkali metal or an alkaline earth metal such as NaOH, KOH or $Ca(OH)_2$, a hydrate thereof or a combination thereof. The basic compound may also be used in the form of an aqueous solution. Here, as the solvent, water or a mixture of water and an organic solvent (specifically, an alcohol or the like) which may be uniformly mixed with water may be used. The basic compound may be added to adjust the pH of the reaction solution, and may be added in an amount such that the pH of the metal solution is in the range of 9 to 14.

Meanwhile, the coprecipitation reaction may be carried out under an inert atmosphere such as nitrogen or argon at a temperature in the range of 25 to 70° C.

The lithium-containing raw material may be a lithium-containing carbonate (e.g., lithium carbonate or the like), a lithium-containing hydrate (e.g., lithium hydroxide I hydrate ($LiOH.H_2O$) or the like), a lithium-containing hydroxide (e.g., lithium hydroxide or the like), a lithium-containing nitrate (e.g., lithium nitrate ($LiNO_3$), a lithium-containing chloride (e.g., LiCl or the like), and the like, and any one or a mixture of two or more thereof may be used.

The doping raw material is mixed with the above-described transition metal hydroxide and lithium-containing raw material and subjected to the first calcination, and is a material for supplying a doping element doped into the positive electrode active material.

The doping raw material includes at least one doping element selected from the group consisting of Al, Mg, Co, V, Ti, Zr and W.

The doping element is doped into the lithium composite transition metal oxide by the first calcination to be described below, so that the structural stability and thermal stability of the lithium composite transition metal oxide, especially the lithium composite transition metal oxide with a high Ni content and/or a lithium composite transition metal oxide with a high Li content, can be further improved.

The doping raw material may preferably include at least one doping element selected from the group consisting of Zr, Co and Al, more preferably include at least one doping element selected from the group consisting of Zr and Al, more preferably include Zr, and most preferably include Zr and Al. When the positive electrode active material or the lithium composite transition metal oxide is doped with the above-described doping element(s), the effect of improving the structural stability and thermal stability of the active material is further improved.

The amount of the doping raw material to be introduced may be suitably adjusted in consideration of the content and content ratio of the doping element in the positive electrode active material to be described below.

The doping raw material may include at least one first doping element selected from the group consisting of Co and Zr, and at least one second doping element selected from the group consisting of Al, Mg, V and W. When the first doping element is used together with the second doping element, the capacity characteristics of the active material as well as the high-temperature lifetime characteristics can be further improved, and the output characteristic can also be improved by reducing the migration resistance of lithium ions. The first doping element may preferably be Zr, and the second doping element may preferably be Al, thus maximizing the effect described above.

The doping raw material may include the first doping element and the second doping element in a weight ratio of 30:70 to 70:30, preferably 40:60 to 60:40. When the weight ratio is within the above-described range, the effect of reducing the migration resistance of the lithium ions, and the effect of enhancing capacity and output according to the improvement of durability may be more preferably realized.

A lithium composite transition metal oxide doped with the doping element may be prepared by mixing a transition metal hydroxide, the lithium-containing raw material and the doping raw material and performing the first calcination treatment thereon.

The doping element is doped into the lithium composite transition metal oxide by the first calcination, so that the structural stability and thermal stability of the lithium composite transition metal oxide, especially the lithium composite transition metal oxide with a high Ni content and/or a lithium composite transition metal oxide with a high Li content, can be further improved to prevent the collapse of the active material structure, the bonding force between the transition metal and oxygen may be improved, thereby enhancing the effect of preventing the desorption of oxygen and maximizing the prevention of the side reactions of the electrolyte solution. Accordingly, the lithium composite transition metal oxide according to the present invention allows the active material to exhibit excellent capacity and have the improved high-temperature cycle characteristics.

The lithium composite transition metal oxide may be a lithium composite transition metal oxide having a ratio (Li/Me) of the number of moles of lithium (Li) with respect to the total number of moles of transition metals of 1 or more. Accordingly, the capacity characteristics and the output characteristics of the battery may be improved in addition to the content ratio of the doping element and coating element which will be described below.

Specifically, the ratio (Li/Me) of the number of moles of lithium (Li) to the total number of moles of the transition metals of the lithium composite transition metal oxide may be in the range of 1 to 1.15, and more specifically in the range of 1.05 to 1.1. When the (Li/Me) is within the above-described range, it is preferred in view of excellent capacity and output characteristics of the battery.

The first calcination may be performed at 700 to 900° C., more preferably at 730 to 850° C., and most preferably at 750 to 830° C. When the first calcination temperature is in the above-described range, sufficient reaction of the mixture may be achieved and the particles may be uniformly grown.

The first calcination may be performed at the above-described temperature for 6 to 15 hours, preferably 8 to 12 hours.

The first calcination may be performed in an oxygen atmosphere. In this case, material movement and reactivity are promoted, so that uniform doping of the positive electrode active material is possible and the amount of unreacted residual lithium in the mixture may be reduced.

A method of preparing a positive electrode active material for a lithium secondary battery according to the present invention may further include a step of cleaning the lithium composite transition metal oxide after the first calcination in terms of removing impurities or unreacted raw materials remaining in the lithium composite transition metal oxide.

The cleansing process may be performed by any method known in the related field without limitation, and may be performed by mixing the lithium composite transition metal oxide with water.

A method of preparing a positive electrode active material for a lithium secondary battery according to the present invention includes a step of mixing the lithium composite transition metal oxide and a coating raw material including at least one coating element selected from the group consisting of Al, Mg, Co, Ti, Zr and B and performing a second calcination treatment thereon to prepare a positive electrode active material for a lithium secondary battery in which a coating layer containing the coating element is formed on the lithium composite transition metal oxide.

The method of preparing a positive electrode active material for a lithium secondary battery further includes a process of forming a coating layer by the second calcination in addition to the doping process to form a coating layer containing the coating element on the lithium composite transition metal oxide. As a result, the chemical stability of the surface of the active material is further improved, the structure collapse due to the instability of the active material is prevented, and the lithium ion easily moves, thereby improving the output characteristics. Specifically, the coating element contained in the coating layer may be preferentially oxidized rather than the transition metal in the lithium composite transition metal oxide, thereby effectively preventing the side reactions between the lithium composite transition metal oxide and the electrolyte and preventing the increase in migration resistance of lithium ions.

The coating raw material may include at least one coating element selected from the group consisting of Al, Mg, Co, Ti, Zr and B, preferably at least one coating element selected from the group consisting of Al, Co and B, more preferably at least one coating element selected from the group consisting of Al and B, more preferably B, and most preferably Al and B.

The coating raw material may include a first coating element including at least one selected from the group consisting of Mg, Co, Ti, Zr, and B, and a second coating element including Al. As the second coating element including Al is used together with the first coating element as the coating raw material, the effect of preventing the structural collapse of the active material by protecting the surface of the active material may be further improved. The first coating element may preferably be at least one selected from the group consisting of Co and B, and more preferably B.

The coating raw material may include the first coating element and the second coating element in a weight ratio of 30:70 to 70:30, preferably 40:60 to 60:40. When the weight ratio is within the above-described range, the effects of protecting the surface and improving structural stability of the active material can be more preferably realized.

The amount of the coating raw material to be introduced may be adjusted considering the content and content ratio of the coating element when the coating layer is formed on the lithium composite transition metal oxide.

For example, the second calcination may be performed at 200 to 500° C., and preferably at 250 to 400° C. When the second calcination temperature is within the above-described range, a sufficient coating layer may be smoothly formed.

The second calcination may be performed at the above-described temperature for 3 hours to 12 hours, preferably 5 hours to 10 hours.

The second calcination may be performed in an air or oxygen atmosphere, thereby promoting material movement and reactivity and facilitating the formation of a coating layer.

In the method of preparing a positive electrode active material for a lithium secondary battery according to the present invention, the doping raw material and the coating raw material are introduced such that the ratio of the weight of the doping element to the weight of the coating element in the positive electrode active material for a lithium secondary battery is in the range of 0.3 to 7, preferably 0.4 to 4.5, more preferably 0.6 to 4.3, and most preferably 1.5 to 3.5.

When the ratio of the weight of the doping element to the weight of the coating element is less than 0.3, the coating layer may be excessively formed, and thus the surface resistance of the positive electrode active material may be increased, resulting in a reduction in charge and discharge efficiency and lowering of output characteristics. When the ratio of the weight of the doping element to the weight of the coating element is more than 7, the high-temperature storage characteristics and durability may decrease due to a relatively excessive doping amount, and the charge-discharge capacity may be reduced.

The ratio of the weight of the doping element to the weight of the coating element according to the present invention is determined by adjusting the content of the materials to be introduced considering the content of the coating element included in the coating raw material introduced during preparation of the positive electrode active material and the content of the doping element included in the doping raw material.

In the method of preparing the positive electrode active material for a lithium secondary battery according to the present invention, the doping raw material may be introduced such that the content of the doping element is in a range of 2,500 to 14,000 ppm, and preferably 3,000 to 9,000 ppm based on the total weight of the positive electrode active material for a lithium secondary battery. When the doping raw material is introduced such that the doping element is doped into the lithium composite transition metal oxide in the above-described content range, the improvement of the structural stability and thermal stability of the active material may be effectively realized. Further, the charge-discharge capacity and efficiency of the battery can be prevented from being lowered due to under- or overdoping.

In the method of preparing the positive electrode active material for a lithium secondary battery according to the present invention, the coating raw material may be introduced such that the content of the coating element is in a range of 1,000 to 9,400 ppm, preferably 1,500 to 9,000 ppm, and more preferably 1,500 to 5,000 ppm based on the total weight of the positive electrode active material for a lithium secondary battery. Within the above-described range, the structural stability may be improved, and an increase in resistance and an output reduction effect due to excessive formation of a coating layer may be prevented.

The content and content ratio of the doping element and/or the coating element contained in the positive electrode active material for the lithium secondary battery may be controlled, for example, in consideration of the amount of the doping raw material and the coating raw material to be introduced during preparation.

The above-described content or content ratio may be measured or calculated through, for example, inductively coupled plasma-optical emission spectrometry (ICP-OES), but the present invention is not limited thereto.

The average particle diameter $D_{50}$ of the positive electrode active material for a lithium secondary battery may be in the range of 5 to 30 μm, preferably in the range of 10 to 20 μm, and more preferably in the range of 14 to 18 μm. The above-described range is preferred in terms of improvement of a rolling property and energy density in the rolling process of the active material.

In the present invention, an average particle diameter $D_{50}$ may be defined as a particle diameter corresponding to 50% of the volume accumulation in a particle diameter distribution curve. The average particle diameter $D_{50}$, for example, may be measured by using a laser diffraction method. For example, a method of measuring the average particle diameter $D_{50}$ of the positive electrode active material may include dispersing particles of the positive electrode active material in a dispersion medium, introducing the dispersed particles into a commercially available laser diffraction particle size measurement device (for example, Microtrac MT 3000) to irradiate the same with an ultrasonic wave of about 28 kHz at an output of 60 W, and measuring the average particle diameter $D_{50}$ corresponding to 50% of the volume accumulation in the measurement device.

Positive Electrode Active Material for Lithium Secondary Battery

Further, the present invention provides a positive electrode active material for a lithium secondary battery.

The positive electrode active material for a lithium secondary battery includes: a lithium composite transition metal oxide including transition metals including nickel (Ni), cobalt (Co) and manganese (Mn), and at least one doping element selected from the group consisting of Al, Mg, Co, V, Ti, Zr and W doped therein; and a coating layer formed on the lithium composite transition metal oxide and including at least one coating element selected from the group consisting of Al, Mg, Co, Ti, Zr and B, and the ratio of the weight of the doping element to the weight of the coating element is in a range of 0.3 to 7.

The positive electrode active material for a lithium secondary battery may be prepared according to the above-described method of preparing a positive electrode active material for a lithium secondary battery, and a lithium composite transition metal oxide doped with the doping element, a coating layer, and a manufacturing method, components and contents thereof are as described above.

The doping element is at least one selected from the group consisting of Al, Mg, Co, V, Ti, Zr and W, preferably at least one selected from the group consisting of Zr, Co and Al, more preferably Zr and Al, even more preferably Zr, and most preferably Zr and Al. When the doping element is included in the positive electrode active material, the structural stability and thermal stability of the active material are further improved.

The doping element may include at least one first doping element selected from the group consisting of Co and Zr and at least one second doping element selected from the group consisting of Al, Mg, V and W. When the first doping element is used together with the second doping element, the capacity characteristics of the active material as well as the high temperature lifetime characteristics may be further improved, and the output characteristic may also be improved by reducing the migration resistance of lithium ions. The first doping element may preferably be Zr, and the second doping element may preferably be Al, thus maximizing the effect described above.

The doping element may include the first doping element and the second doping element in a weight ratio of 30:70 to 70:30, preferably 40:60 to 60:40. When the weight ratio is within the above-described range, the effect of reducing the migration resistance of the lithium ions, and the effect of enhancing capacity and output according to the improvement of durability may be more preferably realized.

The content of the doping element may be in the range of 2,500 to 14,000 ppm, and preferably 3,000 to 9,000 ppm based on the total weight of the positive electrode active material for a lithium secondary battery.

The coating element may include at least one selected from the group consisting of Al, Mg, Co, Ti, Zr and B, preferably at least one selected from the group consisting of Al, Co and B, more preferably at least one selected from the group consisting of Al and B, more preferably B, and most preferably Al and B.

The coating element may include a first coating element including at least one selected from the group consisting of Mg, Co, Ti, Zr, and B, and a second coating element including Al. As the second coating element including Al is used together with the first coating element as the coating element, the effect of preventing the structural collapse of the active material by protecting the surface of the active material may be further improved. The first coating element may preferably be at least one selected from the group consisting of Co and B, and more preferably B.

The coating element may include the first coating element and the second coating element in a weight ratio of 30:70 to 70:30, preferably 40:60 to 60:40. When the weight ratio is within the above-described range, the effects of protecting the surface and improving structural stability of the active material can be more preferably realized.

The content of the coating element may be in the range of 1,000 to 9,400 ppm, preferably 1,500 to 9,000 ppm, and more preferably 1,500 to 5,000 ppm based on the total weight of the positive electrode active material for a lithium secondary battery.

In the positive electrode active material for a lithium secondary battery according to the present invention, the contents of the coating element and the doping element in the positive electrode active material are adjusted to a specific range to exhibit high structural stability and thermal stability of the active material. Accordingly, it is possible to realize excellent capacity and high-temperature cycle characteristics of the battery. In particular, in the lithium composite transition metal oxide with a high nickel content or a lithium composite transition metal oxide with a high lithium content, it is possible to exhibit improved structural stability and thermal stability and to realize excellent capacity and high-temperature cycle characteristics.

Positive Electrode for Lithium Secondary Battery

Further, the present invention provides a positive electrode for a lithium secondary battery including the positive electrode active material for a lithium secondary battery.

Specifically, the positive electrode for a lithium secondary battery includes a positive electrode current collector, and a positive electrode active material layer formed on the positive electrode current collector and including the positive electrode active material for a lithium secondary battery.

In the positive electrode for a lithium secondary battery, the positive electrode current collector is not particularly limited as long as it has conductivity without causing chemical changes in the battery. For example, stainless steel, aluminum, nickel, titanium, calcined carbon or aluminum or stainless steel which is surface-treated with carbon, nickel, titanium, silver or the like may be used. Further, the positive electrode current collector may generally have a thickness of 3 to 500 μm, and fine irregularities may be formed on the current collector surface to enhance the binding force of the positive electrode active material. For example, the positive electrode current collector may be used in various forms such as a film, a sheet, a foil, a net, a porous body, a foam, a nonwoven fabric, etc.

The positive electrode active material layer may include a conductive material and a binder in addition to the above-described positive electrode active material for a lithium secondary battery.

The conductive material is used for imparting conductivity to an electrode, and is not particularly limited as long as it has electronic conductivity without causing chemical changes in the corresponding battery. Specific examples thereof may include graphite such as natural graphite or artificial graphite; carbonaceous materials such as carbon black, acetylene black, Ketjen black, channel black, furnace black, lamp black, thermal black or carbon fiber; powders or fibers of metals such as copper, nickel, aluminum, and silver; conductive whiskers such as zinc oxide or potassium titanate; conductive metal oxides such as titanium oxide; conductive polymers such as polyphenylene derivatives and the like, and any one or a mixture of two or more thereof may be used. The conductive material may be included in an amount of 1 to 30 wt % based on the total weight of the positive electrode active material layer.

The binder serves to enhance the cohesion between the positive electrode active material particles and the binding force between the positive electrode active material and the positive electrode current collector. Specific examples thereof include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinyl pyrrolidone, polytetrafluoroethylene, polyethylene, polypropylene, an ethylene propylene diene polymer (EPDM), a sulfonated EPDM, styrene butadiene rubber (SBR), a fluororubber, various copolymers thereof and the like and any one or a mixture of two or more thereof may be used. The binder may be included in an amount of 1 to 30 wt % based on the total weight of the positive electrode active material layer.

The positive electrode for a lithium secondary battery may be produced according to a conventional positive electrode production method commonly known in the related field except for using the above-described positive electrode active material. Specifically, the positive electrode for a lithium secondary battery may be produced by applying a composition for forming a positive electrode active material layer including the above-described positive electrode active material, and optionally a binder and a conductive material onto a positive electrode current collector and drying and pressing the composition. Here, the type and content of the positive electrode active material, the binder and the conductive material are as described above.

The solvent may be a solvent commonly used in the related field, and examples thereof include dimethyl sulfoxide (DMSO), isopropyl alcohol, N-methylpyrrolidone (NMP), acetone, water or the like, and any one or a mixture of two or more thereof may be used. The amount of the solvent to be used may be suitably adjusted in consideration of application thickness of a slurry and production yield to be enough to dissolve or disperse the positive electrode active material, the conductive material and the binder, and have a viscosity capable of exhibiting excellent thickness uniformity during application for producing the positive electrode.

Further, as another method, the positive electrode for a lithium secondary battery may be produced by casting the composition for forming a positive electrode active material layer on a separate support and then laminating a film separated from the support on the positive electrode current collector.

Lithium Secondary Battery

Further, the present invention provides an electrochemical device including the positive electrode for a lithium secondary battery. The electrochemical device may be specifically a battery or a capacitor, and more specifically, may be a lithium secondary battery.

Specifically, the lithium secondary battery includes a positive electrode, a negative electrode positioned opposite to the positive electrode, a separator interposed between the positive electrode and the negative electrode and an electrolyte. Here, the positive electrode is the same as the above-described positive electrode for a lithium secondary battery. Further, the lithium secondary battery may optionally further include a battery container accommodating the electrode assembly of a positive electrode, a negative electrode, and a separator, and a sealing member sealing the battery container.

In the lithium secondary battery, the negative electrode includes a negative electrode current collector, and a negative electrode active material layer positioned on the negative electrode current collector.

The negative electrode current collector is not particularly limited as long as it has high conductivity without causing chemical changes in the battery. For example, copper, stainless steel, aluminum, nickel, titanium, calcined carbon, copper or stainless steel which is surface-treated with carbon, nickel, titanium, silver or the like, an aluminum-cadmium alloy, or the like may be used. Further, the negative electrode current collector may have a thickness of 3 to 500 µm, and like the positive electrode current collector, fine irregularities may be formed on the current collector surface to enhance the binding force of the negative electrode active material. For example, the negative electrode current collector may be used in various forms such as a film, a sheet, a foil, a net, a porous body, a foam, a nonwoven fabric, etc.

The negative electrode active material layer includes the negative electrode active material, and optionally a binder and a conductive material. The negative electrode active material layer may be formed by applying a composition for forming a negative electrode including the negative electrode active material, and optionally a binder and a conductive material onto the negative electrode current collector, and drying the composition, or may be formed by casting the composition for forming a negative electrode on a separate support and laminating a film separated from the support on the negative electrode current collector.

The negative electrode active material may use a compound capable of reversible intercalation and deintercalation of lithium. Specific examples thereof may include carbonaceous materials such as artificial graphite, natural graphite, graphitized carbon fiber and amorphous carbon; metallic compounds capable of alloying with lithium such as Si, Al, Sn, Pb, Zn, Bi, In, Mg, Ga, Cd, Si alloys, Sn alloys or Al alloys; metal oxides capable of doping and dedoping lithium such as $SiO_p$ ($0<\beta<2$), $SnO_2$, vanadium oxides and lithium vanadium oxides; or composites including the metallic compound and the carbonaceous compound such as Si—C composites or Sn—C composites, and any one, or a mixture of two or more of these may be used. In addition, a metal lithium thin film may be used as the negative electrode active material. Furthermore, a carbon material may use both low crystalline carbon and high crystalline carbon. Low crystalline carbon typically includes soft carbon and hard carbon, and high crystalline carbon typically includes amorphous, platy, scaly, spherical or fiber-shaped natural graphite or artificial graphite, and high-temperature baked carbon such as Kish graphite, pyrolytic carbon, mesophase pitch based carbon fiber, meso-carbon microbeads, mesophase pitches, and petroleum or coal tar pitch derived cokes.

Further, the binder and the conductive material may be the same as those described above for the positive electrode.

Meanwhile, in the lithium secondary battery, the separator separates the negative electrode and the positive electrode and provides a path for migration of lithium ions. The separator may be used without any particular limitation as long as it is commonly used as a separator in the lithium secondary battery. In particular, a separator having low resistance against the ion movement of an electrolyte and excellent impregnability of an electrolyte is preferred. Specifically, porous polymer films such as porous polymer films formed of polyolefin-based polymers such as ethylene homopolymers, propylene homopolymers, ethylene/butene copolymers, ethylene/hexene copolymers, ethylene/methacrylate copolymers and the like or a laminated structure having two or more layers thereof may be used. Further, a nonwoven fabric formed of a conventional porous nonwoven fabric, for example, glass fiber with a high melting point, polyethylene terephthalate fiber or the like may be used. Further, a coated separator containing a ceramic component or a polymer material to secure heat resistance or mechanical strength may be used, and may be optionally used as a single layer or a multilayer structure.

Further, examples of the electrolyte used in the present invention include an organic liquid electrolyte, an inorganic liquid electrolyte, a solid polymer electrolyte, a gel-type polymer electrolyte, a solid inorganic electrolyte, a molten-type inorganic electrolyte and the like which are usable in the production of the secondary battery, but are not limited thereto.

Specifically, the electrolyte may include an organic solvent and a lithium salt.

The organic solvent may be used without limitation as long as it may act as a medium which enables the movement of ions involved in the electrochemical reactions of a battery. Specifically, the organic solvent may be an ester-based solvent such as methyl acetate, ethyl acetate, γ-butyrolactone, ε-caprolactone and the like; an ether-based solvent such as dibutyl ether, tetrahydrofuran or the like; a ketone-based solvent such as cyclohexanone; an aromatic hydrocarbon-based solvent such as benzene, fluorobenzene and the like; a carbonate-based solvent such as dimethyl carbonate (DMC), diethyl carbonate (DEC), ethyl methyl carbonate (EMC), ethylene carbonate (EC), propylene carbonate (PC) and the like; an alcohol-based solvent such as ethyl alcohol, isopropyl alcohol and the like; nitriles such as R-CN (wherein R is a linear, branched or cyclic C2 to C20 hydrocarbon group and may include a double-bonded aromatic ring or an ether bond); amides such as dimethylformamide; dioxolanes such as 1,3-dioxolane; or sulfolanes, etc. Among them, a carbonate-based solvent is preferred, and a mixture of a cyclic carbonate having high ionic conductivity and a high dielectric constant, such as ethylene carbonate or propylene carbonate, which can increase the charge and discharge performance of the battery, and a linear carbonate-based compound with low viscosity (for example, ethyl methyl carbonate, dimethyl carbonate, diethyl carbonate, etc.) is more preferred. In this case, when the cyclic carbonate and the chain-type carbonate are mixed in a volume ratio of about 1:1 to about 1:9, the performance of the electrolyte may be excellent.

The lithium salt may be used without particular limitation as long as it is a compound capable of providing lithium ions used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$, etc. The concentration of the lithium salt is preferably within the range of 0.1 to 2.0M. When the concentration of the lithium salt is within the above-described range, the electrolyte has suitable conductivity and viscosity, so that it may exhibit excellent electrolyte performance and the lithium ion may effectively move.

In addition to the above-described components of the electrolyte, additives such as a haloalkylene carbonate-based compound such as difluoroethylene carbonate and the like; or pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinones, N,N-substituted imidazolidines, ethylene glycol dialkyl ethers, ammonium salts, pyrrole, 2-methoxyethanol, aluminum trichloride or the like may be added to the electrolyte for the purpose of improving lifetime characteristics of the battery, suppressing a reduction in battery capacity, and improving discharge capacity of the battery. Here, the additive may be included in an amount of 0.1 to 5 wt % based on the total weight of the electrolyte.

As described above, since a lithium secondary battery including the positive electrode active material for a lithium secondary battery according to the present invention stably exhibits excellent discharge capacity, an excellent output characteristic and an excellent capacity retention rate, it is used in the field of portable devices such as mobile phones, laptop computers and digital cameras, and the field of electric vehicles such as hybrid electric vehicles (HEV), and the like.

Accordingly, the present invention provides a battery module including the lithium secondary battery as a unit cell, and a battery pack including the battery module.

The battery module or the battery pack may be used as a power supply of a medium to large sized device of any one or more of power tools; electric vehicles including electric vehicles (EV), hybrid electric vehicles and plug-in hybrid electric vehicle (PHEV); or systems for power storage.

Hereinafter, the present invention will be described in detail with reference to examples so that those skilled in the art can readily carry out the invention. However, the present invention may be embodied in various different forms and is not limited to the examples described below.

EXAMPLES

Example 1

$Ni_{0.88}Co_{0.09}Mn_{0.03}(OH)_2$, which is a transition metal hydroxide prepared by mixing $NiSO_4 \cdot 6H_2O$, $CoSO_4 \cdot 7H_2O$ and $MnSO_4 \cdot H_2O$ and coprecipitating the mixture, was mixed with LiOH as a lithium containing raw material, and $ZrO_2$ and $Al_2O_3$ as doping raw materials. Here, a ratio (Li/Me) of the number of moles of lithium (Li) with respect to the total number of moles of transition metals (nickel, cobalt and manganese) was adjusted to 1.07 and the lithium containing raw material was introduced. Subsequently, the doping raw materials were introduced so that the content of Zr is 2,000 ppm and the content of Al is 2,000 ppm based on the weight of the positive electrode active material for a lithium secondary battery to be described below.

The mixture was subject to first calcination at 780° C. for 8 hours, and then the first calcined material was mixed with ultrapure water at a weight ratio of 1:1 and cleaned for 20 minutes, and filtration was performed using a vacuum filter. After filtration, drying was carried out at 130° C. under vacuum conditions to prepare a lithium composite transition metal oxide having Zr and Al doped therein.

The lithium composite transition metal oxide was mixed with $H_3BO_3$ and $Al(OH)_3$ as coating raw materials. Here, the coating raw materials were introduced so that the content of B was 1,000 ppm and the content of Al was 1,000 ppm with respect to the weight of the positive electrode active material for a lithium secondary battery to be described below. Thereafter, second calcination was performed at 350° C. for 7 hours to prepare a positive electrode active material for a lithium secondary battery (average diameter $D_{50}$: 15 μm) in which a coating layer containing B and Al was formed on the lithium composite transition metal oxide.

In the positive electrode active material for a lithium secondary battery, the ratio of the weight of the doping elements to the weight of the coating elements was 2.

Examples 2 to 11 and Comparative Examples 1 to 3

The positive electrode active materials for a lithium secondary battery of Examples 2 to 11 and Comparative Examples 1 to 3 were prepared in the same manner as in Example 1 except that the types and the amounts of the doping raw materials and the coating raw materials were adjusted.

The contents and weight ratio of the doping elements and the coating elements of Examples 1 to 11 and Comparative Examples 1 to 3 are shown in the following Table 1.

TABLE 1

| Classification | Doping | | Coating | | Weight ratio of doping element to coating element |
|---|---|---|---|---|---|
| | Doping element | Weight of doping element with respect to total weight of positive electrode active material (ppm) | Coating element | Weight of coating element with respect to total weight of positive electrode active material (ppm) | |
| Example 1 | Zr | 2000 | B | 1000 | 2 |
| | Al | 2000 | Al | 1000 | |
| Example 2 | Zr | 2500 | B | 1000 | 4.25 |
| | Al | 6000 | Al | 1000 | |

TABLE 1-continued

| Classi-fication | Doping element | Doping Weight of doping element with respect to total weight of positive electrode active material (ppm) | Coating element | Coating Weight of coating element with respect to total weight of positive electrode active material (ppm) | Weight ratio of doping element to coating element |
|---|---|---|---|---|---|
| Example 3 | Zr | 2000 | B | 1000 | 0.44 |
|  | Al | 2000 | Al | 8000 |  |
| Example 4 | Zr | 2000 | B | 2000 | 2 |
|  | Al | 2000 |  |  |  |
| Example 5 | Zr | 2000 | Co | 1000 | 2 |
|  | Al | 2000 | Al | 1000 |  |
| Example 6 | Co | 2000 | B | 1000 | 2 |
|  | Al | 2000 | Al | 1000 |  |
| Example 7 | Zr | 4000 | B | 1000 | 2 |
|  |  |  | Al | 1000 |  |
| Example 8 | Zr | 4000 | B | 2000 | 2 |
| Example 9 | Zr | 2000 | B | 500 | 4.67 |
|  | Al | 5000 | Al | 1000 |  |
| Example 10 | Zr | 2000 | B | 1500 | 4.67 |
|  | Al | 5000 |  |  |  |
| Example 11 | Zr | 1500 | B | 1000 | 6.50 |
|  | Al | 5000 |  |  |  |
| Comparative Example 1 | — | — | B | 1000 | 0 |
|  |  |  | Al | 1000 |  |
| Comparative Example 2 | Zr | 10000 | B | 1000 | 10 |
|  | Al | 10000 | Al | 1000 |  |
| Comparative Example 3 | Zr | 250 | B | 2000 | 0.05 |
|  | Al | 250 | Al | 8000 |  |

Experimental Examples

The positive electrode active material for a lithium secondary battery prepared in the Examples and the Comparative Examples, carbon black as a conductive material and PVdF as a binder were mixed in an N-methylpyrrolidone solvent in a weight ratio of 96.5:1.5:2 to prepare a positive electrode composite material (viscosity: 5000 mPa·s). The positive electrode composite material was applied onto a surface of an aluminum current collector, dried at 130° C., and rolled to produce a positive electrode.

Lithium metal was used as a negative electrode.

A separator formed of porous polyethylene was interposed between the positive electrode produced as described above and the negative electrode to prepare an electrode assembly, the electrode assembly was positioned inside a case, and an electrolytic solution was injected into the case to produce a lithium secondary battery half-cell. Here, the electrolytic solution was prepared by dissolving lithium hexafluorophosphate ($LiPF_6$) with a concentration of 1.0 M in an organic solvent including ethylene carbonate/dimethyl carbonate/ethyl methyl carbonate (volume ratio of mixed EC/DMC/EMC=3/4/3).

Experimental Example 1: Evaluation of High-Temperature Lifetime Characteristics Each lithium secondary battery half-cell produced as described above using each positive electrode active material prepared in the Examples and Comparative Examples was charged at 45° C. under a CCCV mode of 0.3 C and a voltage of 4.25V (termination current: 1/20 C), and then discharged at a constant current of 0.3 C to a voltage of 2.5V. The capacity retention rate was measured after 30 cycles of a charge and discharge experiment were performed to evaluate high-temperature lifetime characteristics. The results are shown in Table 2.

TABLE 2

|  | Capacity retention rate (%) (@30 cycles) |
|---|---|
| Example 1 | 97.2 |
| Example 2 | 98.5 |
| Example 3 | 95.3 |
| Example 4 | 96.0 |
| Example 5 | 96.4 |
| Example 6 | 97.0 |
| Example 7 | 95.9 |
| Example 8 | 95.2 |
| Example 9 | 94.4 |
| Example 10 | 93.3 |
| Example 11 | 95.1 |
| Comparative Example 1 | 94.1 |
| Comparative Example 2 | 94.8 |
| Comparative Example 3 | 93.3 |

Referring to Table 2, it can be seen that the positive electrode active materials for a lithium secondary battery of the Examples prepared using the method of preparing the positive electrode active material for a lithium secondary battery of the present invention all exhibit capacity retention ratios which are superior to those of the Comparative Examples.

In the case of Examples 1 and 2 in which the ratio of the weight of the doping element to the weight of the coating element in the active material is in the preferable range, the doping elements are Zr and Al, and the coating elements are B and Al, the capacity retention ratio was evaluated to be superior to those of Examples 3 to 11.

Experimental Example 2: Evaluation of Resistance and Resistance Increase Rate The discharge resistance of each lithium secondary battery half-cell produced as described above using each positive electrode active material prepared in the Examples and Comparative Examples, which underwent evaluation at 30 cycles of 0.3 C/0.3 C at 45° C., was calculated. The calculation of the resistance was based on a voltage drop and a current value applied when the 4.25 V-full charge cell was discharged at 0.3 C for 60 seconds. The calculated initial resistance value (1 cycle) and the resistance increase rate at 30 cycles are shown in Table 3.

The resistance increase rate at 30 cycles was calculated by the following Equation 1.

Resistance increase rate at 30 cycles (%)=(Resistance at 30 cycles)/(Resistance at one cycle)× 100    [Equation 1]

TABLE 3

|  | Initial resistance (Ω) | Resistance increase rate (%) |
|---|---|---|
| Example 1 | 14.2 | 218 |
| Example 2 | 13.2 | 187 |
| Example 3 | 17.8 | 273 |
| Example 4 | 15.5 | 221 |
| Example 5 | 15.2 | 244 |
| Example 6 | 13.6 | 239 |
| Example 7 | 15.9 | 251 |
| Example 8 | 16.4 | 246 |
| Example 9 | 16.1 | 298 |
| Example 10 | 16.5 | 280 |
| Example 11 | 17.0 | 275 |
| Comparative Example 1 | 18.2 | 347 |
| Comparative Example 2 | 18.9 | 278 |
| Comparative Example 3 | 19.6 | 329 |

Referring to Table 3, it can be seen that the positive electrode active materials for a lithium secondary battery according to the Examples have a lower initial resistance and a lower resistance increase rate as compared with those of the Comparative Examples.

It can be seen that, in the case of Examples 1 and 2 in which the ratio of the weight of the doping element to the weight of the coating element in the active material is in the preferable range, the doping elements are Zr and Al, and the coating elements are B and Al, the initial resistance and resistance increase rate are somewhat lower than those of Examples 3 to 11.

Experimental Example 3: Evaluation of Thermal Stability

Each lithium secondary battery half-cell produced using each positive electrode active material prepared in the Examples and Comparative Examples was charged at a current of 0.2 C and decomposed at a state of charge (SOC) of 100%. Then, a positive electrode and a new electrolytic solution were introduced into a differential scanning calorimetry (DSC) measurement cell, and thermal stability was evaluated by differential scanning calorimetry (DSC) while a temperature was raised from room temperature to 400° C. at a rate of 10° C. per minute. As a result, a temperature at which the main peak appears and where the heat flux is the maximum is shown in the following Table 4. Here, the higher the DSC peak value, the better the thermal stability.

TABLE 4

|  | DSC main peak (° C.) |
|---|---|
| Example 1 | 231 |
| Example 2 | 236 |
| Example 3 | 228 |
| Example 4 | 230 |
| Example 5 | 230 |

TABLE 4-continued

|  | DSC main peak (° C.) |
|---|---|
| Example 6 | 232 |
| Example 7 | 230 |
| Example 8 | 233 |
| Example 9 | 229 |
| Example 10 | 226 |
| Example 11 | 227 |
| Comparative Example 1 | 224 |
| Comparative Example 2 | 220 |
| Comparative Example 3 | 225 |

Referring to Table 4, it can be seen that the positive electrode active materials for a lithium secondary battery according to the Examples have higher maximum peak values as measured by DSC than those of the Comparative Examples, and thus have excellent structural stability and thermal stability.

However, it can be seen that, in the case of the Comparative Examples in which the ratio of the weight of the doping element to the weight of the coating element in the active material is out of the range according to the present invention, a DSC maximum peak temperature is lower than those of the Examples, and thus thermal stability is poor.

Experimental Example 4: Evaluation of Charge and Discharge Characteristics

Each lithium secondary battery half-cell produced as described above using each positive electrode active material prepared in the Examples and Comparative Examples was charged and discharged at room temperature (25° C.) under conditions of 0.2 C/0.2 C within a voltage range of 2.5 to 4.25V, and then the initial charge and discharge characteristics were evaluated. The results thereof are shown in Table 5.

TABLE 5

|  | Charging at 0.2 C (mAh/g) | Discharging at 0.2 C (mAh/g) | Efficiency (%) |
|---|---|---|---|
| Example 1 | 232.5 | 215.1 | 92.5 |
| Example 2 | 227.8 | 208.3 | 91.4 |
| Example 3 | 228.5 | 209.1 | 91.5 |
| Example 4 | 231.9 | 214.0 | 92.3 |
| Example 5 | 230.8 | 211.3 | 91.6 |
| Example 6 | 231.9 | 215.4 | 92.9 |
| Example 7 | 233.8 | 217.2 | 92.9 |
| Example 8 | 233.0 | 216.1 | 92.7 |
| Example 9 | 231.0 | 209.1 | 90.5 |
| Example 10 | 233.4 | 212.4 | 91.0 |
| Example 11 | 232.7 | 211.8 | 91.0 |
| Comparative Example 1 | 236.2 | 218.7 | 92.6 |
| Comparative Example 2 | 217.6 | 195.1 | 89.7 |
| Comparative Example 3 | 229.1 | 207.6 | 90.6 |

Referring to Table 5, it can be seen that the positive electrode active materials for a lithium secondary battery according to the Examples have charge-discharge capacity and efficiency which are superior to those of the Comparative Examples.

In particular, the charge-discharge capacity and efficiency of Comparative Examples 2 and 3 are significantly lowered in comparison with those of the Examples. It can be seen that, in the case of Comparative Example 1, the charge-discharge capacity and efficiency are similar to those of the Examples, but as described above, the capacity retention rate, resistance characteristics and thermal stability of Comparative Example 1 are much lower than those of the Examples, that is, the overall performance is lower than that of the Examples.

The invention claimed is:

1. A method of preparing a positive electrode active material for a lithium secondary battery, comprising:
   mixing a transition metal hydroxide containing transition metals including nickel (Ni), cobalt (Co) and manganese (Mn), a lithium-containing raw material and a doping raw material including at least one doping element selected from the group consisting of Al, Mg, Co, V, Ti, Zr and W and performing a first calcination treatment thereon to prepare a lithium composite transition metal oxide doped with the doping element; and
   mixing the lithium composite transition metal oxide and a coating raw material including at least one coating element selected from the group consisting of Al, Mg, Co, Ti, Zr and B and performing a second calcination treatment thereon to prepare a positive electrode active material for a lithium secondary battery in which a coating layer containing the coating element is formed on the lithium composite transition metal oxide,
   wherein the doping raw material and the coating raw material are introduced such that a ratio of a weight of the doping element to a weight of the coating element in the positive electrode active material for a lithium secondary battery is in a range of 0.3 to 7,
   a ratio of a number of moles of lithium to a total number of moles of transition metals of the lithium composite transition metal oxide is in a range of 1.05 to 1.1,
   a content of the doping element is in a range of 2,500 to 14,000 ppm based on a total weight of the positive electrode active material, and
   a content of the coating element is in a range of 1,000 to 9,400 ppm based on a total weight of the positive electrode active material for a lithium secondary battery.

2. The method according to claim 1, wherein the doping raw material comprises:
   at least one first doping element selected from the group consisting of Co and Zr, and
   at least one second doping element selected from the group consisting of Al, Mg, V and W.

3. The method according to claim 2, wherein the doping raw material includes the first doping element and the second doping element in a weight ratio of 30:70 to 70:30.

4. The method according to claim 1, wherein the doping raw material includes at least one doping element selected from the group consisting of Zr, Co and Al.

5. The method according to claim 1, wherein the coating raw material includes at least one first coating element selected from the group consisting of Mg, Ti, Zr and B and a second coating element including Al.

6. The method according to claim 5, wherein the coating raw material includes the first coating element and the second coating element in a weight ratio of 30:70 to 70:30.

7. The method according to claim 1, wherein the coating raw material includes at least one coating element selected from the group consisting of Al, Co and B.

8. The method according to claim 1, wherein the transition metal hydroxide has a nickel (Ni) content of 70 mol % or more among total transition metal elements contained in the transition metal hydroxide.

9. A positive electrode active material for a lithium secondary battery, comprising:
   a lithium composite transition metal oxide including transition metals including nickel (Ni), cobalt (Co) and manganese (Mn), and at least one doping element selected from the group consisting of Al, Mg, Co, V, Ti, Zr and W doped therein; and
   a coating layer formed on the lithium composite transition metal oxide, wherein the coating layer includes at least one coating element selected from the group consisting of Al, Mg, Co, Ti, Zr and B,
   wherein a ratio of a weight of the doping element to a weight of the coating element is in a range of 0.3 to 7,
   a ratio of a number of moles of lithium to a total number of moles of transition metals of the lithium composite transition metal oxide is in a range of 1.05 to 1.1,
   a content of the doping element is in a range of 2,500 to 14,000 ppm based on a total weight of the positive electrode active material, and
   a content of the coating element is in a range of 1,000 to 9,400 ppm based on a total weight of the positive electrode active material.

10. The positive electrode active material according to claim 9, wherein the doping element comprises:
    at least one first doping element selected from the group consisting of Co and Zr, and
    at least one second doping element selected from the group consisting of Al, Mg, V and W.

11. The positive electrode active material according to claim 9, wherein the coating element comprises:
    at least one first coating element selected from the group consisting of Mg, Ti, Zr and B, and
    a second coating element including Al.

12. A positive electrode for a lithium secondary battery, comprising the positive electrode active material for a lithium secondary battery according to claim 9.

13. A lithium secondary battery, comprising the positive electrode for a lithium secondary battery according to claim 12.

* * * * *